United States Patent [19]

Leslie et al.

[11] 4,102,364
[45] Jul. 25, 1978

[54] METHOD OF DUNNAGE BAG INFLATION

[75] Inventors: John H. Leslie, Winnetka; Barry R. Angarola, Schaumburg; A. L. Nocom, Des Plaines, all of Ill.

[73] Assignee: Signode Corporation, Glenview, Ill.

[21] Appl. No.: 820,088

[22] Filed: Jul. 29, 1977

[51] Int. Cl.² .............................................. B65B 3/04
[52] U.S. Cl. ........................................... 141/4; 141/10
[58] Field of Search .................. 141/10, 114, 313–317, 141/4–8, 392

[56] References Cited

U.S. PATENT DOCUMENTS 2,296,163  9/1942  Hartman .............................. 141/10

*Primary Examiner*—Houston S. Bell, Jr.
*Attorney, Agent, or Firm*—Dressler, Goldsmith, Clement, Gordon & Shore, Ltd.

[57] ABSTRACT

A method is disclosed for rapidly filling an inflatable dunnage bag with entrained ambient air to a predetermined maximum stabilized pressure level. A dunnage bag is provided with a housing defining a chamber extending from an opening on the exterior of the bag to an opening in the interior of the bag. In the preferred form of the method, a supply of pressurized gas or air is brought adjacent to the housing in the dunnage bag and is located relative to the housing and in alignment with the chamber to permit flow of ambient air into the chamber. One or more jets of high pressure gas or air are discharged into the chamber substantially parallel to, and spaced from, the walls of the chamber, whereby, ambient air is entrained through the chamber to the interior of the bag until an equilibrium is reached where the mass flow rate of the air entering the bag equals the mass flow rate of the air flowing back out of the bag in response to the internal pressure.

16 Claims, 19 Drawing Figures

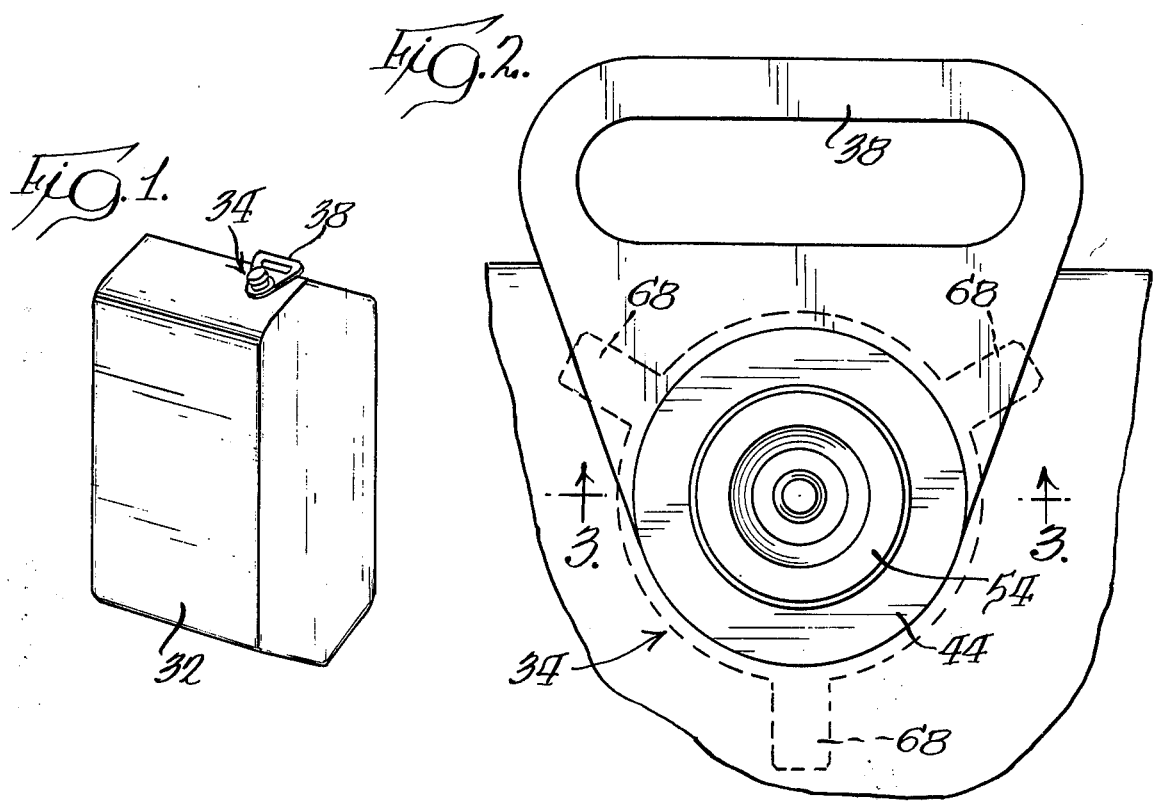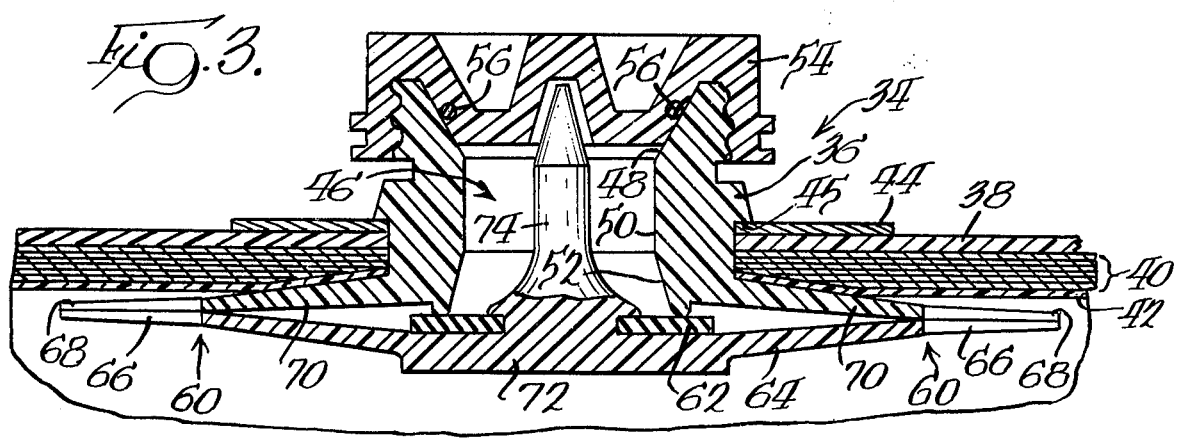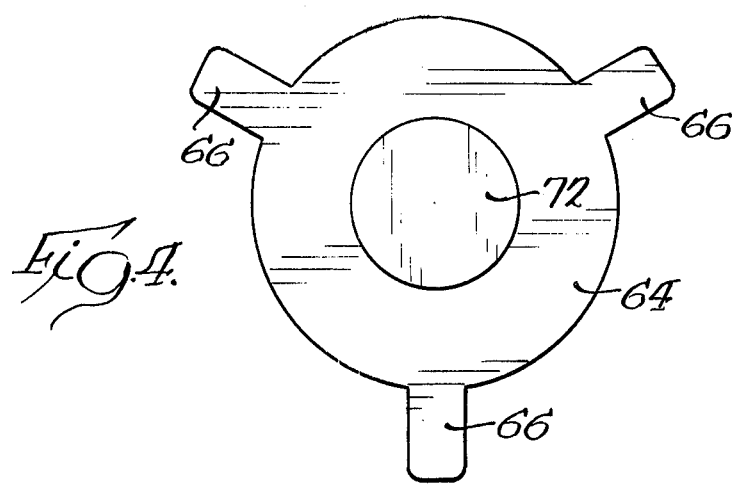

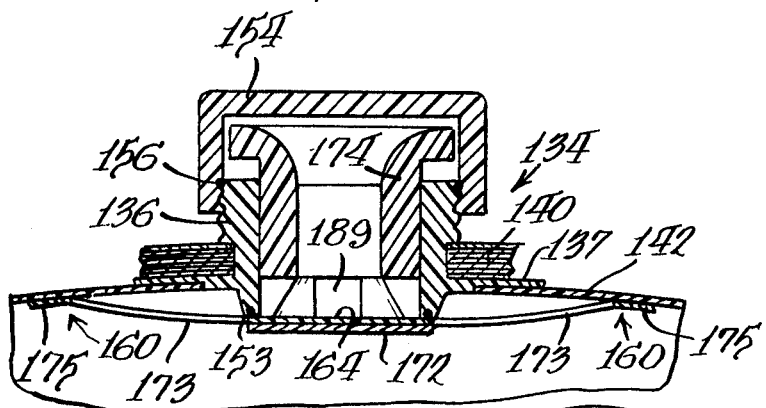

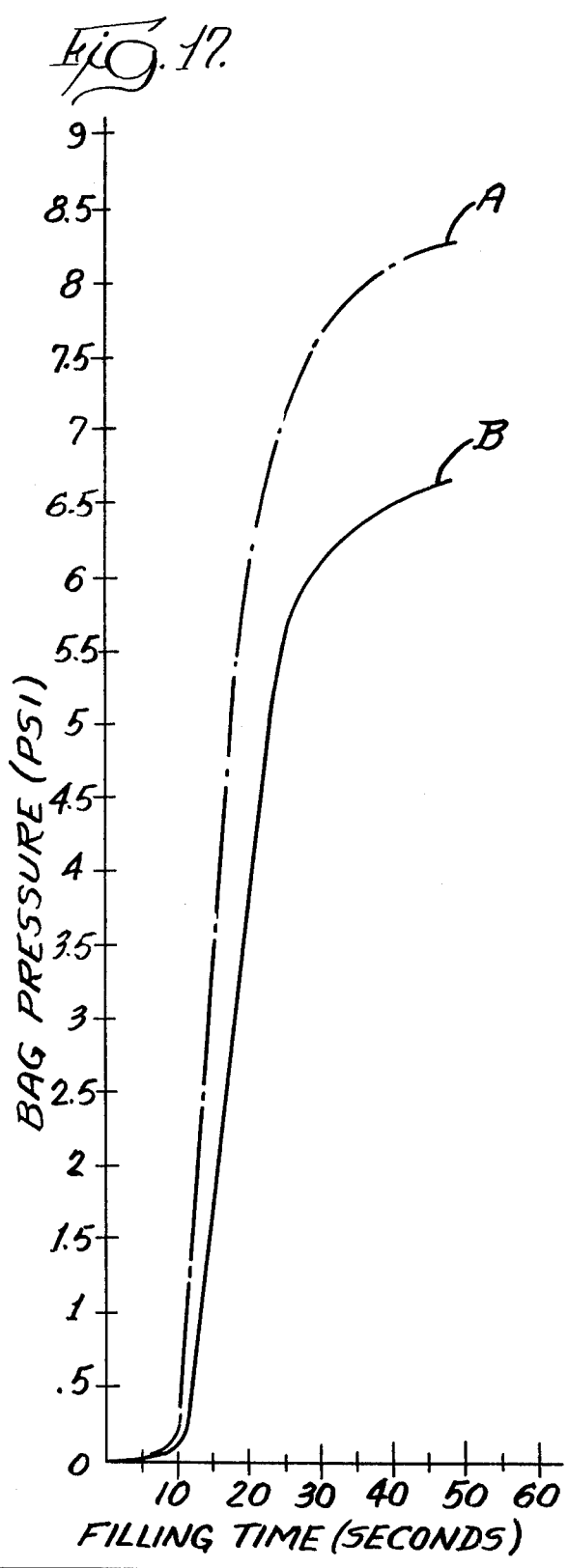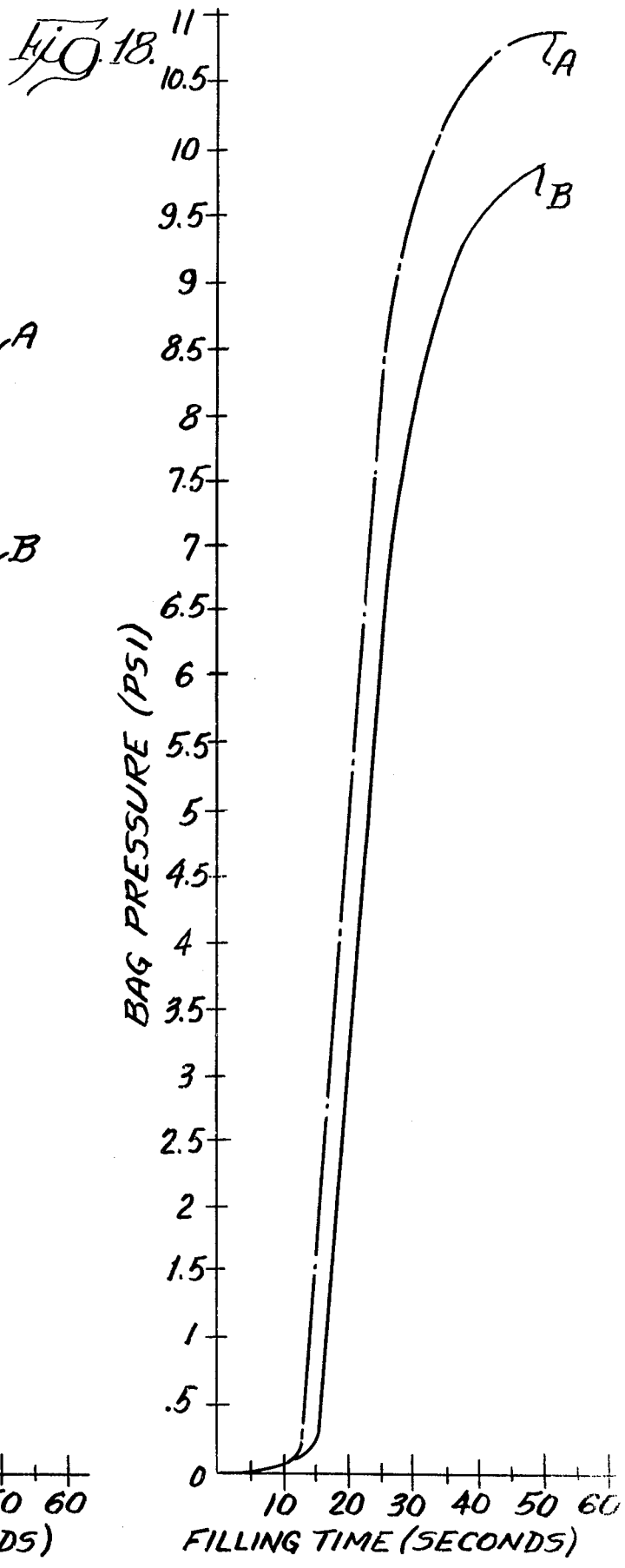

METHOD OF DUNNAGE BAG INFLATION

BACKGROUND OF THE INVENTION

This application is related to the concurrently filed Angarola et al. applications, Ser. Nos. 820,210, 820,162, and 820,163, entitled, respectively, "Dunnage Bag Inflation Air Gun," "Apparatus for Rapidly Inflating and Pressurizing a Dunnage Bag," and "Dunnage Bag Fill Valve."

This invention relates to dunnage bags for use in shipment of freight by rail, ship, truck, aircraft, and the like, and more particularly to inflatable, disposable dunnage bags for such use. Dunnage bags may be reusable, and if reusable, are usually made of single or multiple plies of rubber, plastic, or fabric. Alternatively, dunnage bags may be disposable. Typically, such disposable dunnage bags have a gas-tight bladder (usually polyethylene) surrounded by an outer protective and supportive shroud consisting of one or more plies of material, usually heavy paper. The inflatable, disposable dunnage bags are used in freight carriers where it is customary to fill the spaces between the cargo, or between the cargo and the walls of the freight carrier, to prevent the cargo from shifting and damaging either the cargo itself and/or the walls of the freight carrier. Inflatable, disposable dunnage bags are placed between the cargo in a deflated condition and are subsequently inflated with a gas, usually air, to a certain design pressure, typically between 1 and 8 pounds per square inch gauge, dependent on the size and wall structure of the particular bag.

Experience with this type of dunnage bag has revealed certain difficulties during inflation. First, in the United States, such dunnage bags are normally inflated with high pressure air nozzles through a valve in the side of the bag. The valves most commonly used are of the well-known Schrader type which are relatively small, having an exterior diameter of about 9/16 inch. These valves typically have a helical spring to bias a valve stem or plug against a relatively small internal orifice, usually between one-sixteenth and five-sixteenths inch in diameter. The valve housing is typically constructed of polyethylene which can be heat-sealed to the dunnage bag bladder to form an airtight connection. However, the valve stem is typically plastic or metal and the biasing spring is typically constructed from metal, such as steel. It would be desirable to provide a method of dunnage bag inflation that could be used with a more simplified valve design.

Typically, dunnage bags are inflated with high pressure air in the range of between 30 and 120 pounds per square inch gauge. Thus, unless the inflation time or air pressure is carefully regulated (as by means of a pressure regulating device near the discharge of the air hose), it is quite easy to pressurize a bag beyond the design, or allowable, pressure and to thereby rupture the bag and possibly damage the cargo and/or carrier. Thus, it would be desirable to provide a method of inflation using a gas such as air to effect the filling of such dunnage bags without the danger of overpressurization.

It has been suggested that low pressure air could be used to fill dunnage bags. However, the use of low pressure air, by itself, has a number of drawbacks. First, the time required to fill a dunnage bag through the small internal orifice of the Schrader type valve in use today would be much longer than the time required to fill a dunnage bag when using high pressure air. Also, a dunnage bag can still be overpressurized and ruptured (which may damage the cargo) when using low pressure air unless the "low" pressure is adjusted low enough for the particular dunnage bag. Thus, in situations where a number of different sizes of dunnage bags (having different design fill pressures) are to be inflated with the same low pressure air supply, the low pressure air supply pressure would still have to be carefully regulated to accommodate each different bag being filled. To overcome these drawbacks, it would be desirable to provide a method for filling different design pressure dunnage bags with pressurized air relatively rapidly and to provide a means for self-limiting the maximum pressure to which the dunnage bag could be filled.

Another problem encountered with the filling of inflatable dunnage bags results from the fact that such bags are filled after they have been placed and positioned between cargo or between the walls of the freight carrier and the cargo. Consequently, there are many times when access to the fill valve on the dunnage bag is extremely limited. In those instances, there is very little clearance area around a fill valve and this precludes the use of large, elongated gun-type air injection mechanisms that stick out a number of inches from the top of the valve during inflation. Consequently, it would be desirable to provide a method for inflating dunnage bags which would not require apparatus that projects a relatively great distance from the exterior surface of the bag.

SUMMARY OF THE INVENTION

In the instant invention, a novel method is provided for filling inflatable dunnage bags with a mixture of high pressure air and entrained ambient air. A fill housing is mounted in a wall of the dunnage bag and defines a chamber extending from an opening on the exterior of the bag to an opening in the interior of the bag. The housing may or may not have a valve closure means. According to the method of the present invention, at least one jet of pressurized gas is discharged from a discharge point located in a region of ambient air and passed through at least part of the chamber in the direction from the exterior opening to the interior opening. The gas jet is preferably located relative to the chamber with the cross-sectional flow area of the jet in the chamber less than the cross-sectional area of the chamber's exterior opening. The gas jet is aligned to pass through the chamber into the bag whereby a quantity of ambient air is aspirated or entrained from the region of ambient air through the chamber and into the bag. This method is preferably performed using pressurized air from an air injection device which is placed on, or engaged with, a portion of the housing on the dunnage bag in a particular manner whereby one or more jets of the pressurized air are injected into the chamber and whereby ambient air is entrained into the chamber from the region of ambient air between portions of the injection device and the housing.

In the method of the present invention, the sum of the cross-sectional areas of the jets of high pressure gas injected into the chamber is preferably equal to or less than the cross-sectional flow area of the chamber exterior opening and this enables relatively large amounts of entrained ambient air to be aspirated through the valve for filling the bag relatively rapidly. Further, the amount of pressurized gas thus used is only a small fraction of the entrained ambient air which is aspirated through the housing chamber.

The novel method of the instant invention can be used with a fill housing that also functions as a self-closing fill valve. Such a fill valve preferably has a valve seat around the periphery of the interior opening on the end of the housing in the bag and has a valve means or closure member which is movable towards and away from the seat. The closure member is secured to a generally flat, inelastic, flexibly hinged mounting member which is disposed across the interior opening of the valve and which biases the valve member into sealing engagement with the seat to prevent flow of air from the inflated bag. A stem is provided in the valve chamber and is connected to the valve member so that when a suitably designed air injection device is engaged with the valve, the stem will be depressed to urge the valve closure member away from the valve seat to open the valve.

Preferably, the valve housing is polyethylene and is substantially cylindrical. The interior chamber is substantially cylindrical with a converging, frustoconical exterior opening and a diverging, frustoconical interior opening. The flexibly hinged mounting member is a substantially circular sheet of polyethylene covering and extending beyond the bottom of the valve housing. It is secured at intervals about its periphery with tabs to an upper mating flange extending from the valve housing. When the valve closure member is moved downwardly away from the valve interior opening in response to an air injection device engaging the stem, the bias of the flexibly hinged circular mounting sheet is overcome. The sheet then moves downwardly so that the incoming air can flow through the space at edges of the circular sheet and upper mating flange, between the tabs, to thereby fill the bag.

The jets of high pressure gas are preferably supplied in accordance with the method of the present invention by an injection device, such as, a hollow tubular member, which can be connected to a pressurized gas or air supply hose, or to an on-off valve on such a supply hose, and which functions to provide a rigid conduit for bringing the pressurized gas or air to the dunnage bag fill valve or fill housing. In one embodiment, the tubular member has mounted near one end a ring-like alignment frame having an annular shoulder adapted to seat on the exterior portion of a cylindrical dunnage bag housing or fill valve so as to effect a relative alignment between the tubular member and the housing wherein the tubular member extends across the diameter of the chamber defined by the housing. When the injection device is so engaged with the fill valve, ambient air is free to flow between the exterior portions of the tubular member and the chamber.

Circular gas jet discharge orifices are provided in a flattened wall portion of the tube facing the chamber of the dunnage bag fill valve or housing. The orifices are spaced at equal intervals about the perimeter of a circle in the flattened wall portion with the circle of orifices being substantially concentric with the ring-like alignment frame and thus having a central axis substantially coincident with the central axis of the dunnage bag fill housing or valve. Preferably the diameter of the circle of orifices is less than the diameter of the exterior inlet opening of the valve chamber such that the orifices are spaced from the wall of the chamber and such that gas is discharged from the orifices and into and through the chamber, thereby entraining or aspirating ambient air from the region between the orifices and the chamber walls and then through the chamber and into the dunnage bag.

The tubular member is preferably a cylindrical tube with a diameter on the order of between 0.5 inch and 0.25 inch. The flattened wall portion of the tube (which contains the orifices) is preferably located by the ring-like alignment frame less than 0.125 inch above the top of the dunnage bag fill housing or valve. Thus, the total projection of the inflation device beyond the outermost portion of the dunnage bag fill housing or valve is nine-sixteenths inch, or less. Such a relatively small projecting engagement dimension is extremely advantageous from the standpoint of filling dunnage bags in situ between cargo items where only few inches of clearance may exist around the dunnage bag fill valve or housing.

It is contemplated that with the method of the present invention, for a given fixed construction of an injection device, various sizes of dunnage bags having various allowable design fill pressure levels can be inflated. To this end, the fill housings or fill valves of the differently sized bags are provided with differing internal cross-sectional area dimensions. The ultimate pressure that may be achieved within a given bag has been found to be dependent on, among other things, the specific dimensions of the chamber in the fill housing or valve. Thus, with a given construction of the gas injection device, dunnage bags having differing maximum allowable pressure level requirements can be fabricated with fill valves having differing internal chamber dimensions but having the same exterior dimensions suitable for engagement with the injection device. By properly matching the valve sizes with a specific injection device, the single injection device can have the capability of filling various sizes of dunnage bags, with each bag being filled to its maximum allowable pressure level and not in excess thereof. Thus, a single gun or injection device can be used in the field with a single preset pressure supply to fill a number of variously sized bags.

Numerous other advantages and features of the present invention will become readily apparent from the following detailed description of the invention, from the claims and from the accompanying drawings.

BRIEF DESCRIPTION OF THE DRAWINGS

In the accompanying drawings forming part of the specification, and in which like numerals are employed to designate like parts throughout the same, FIG. 1 is a perspective view of an inflated dunnage bag with a fill valve device located on one end of the bag and adapted to be used with the gas injection device for inflating the dunnage bag according to the method of the present invention;

FIG. 2 is an enlarged, partial top plan view of the fill valve device and dunnage bag;

FIG. 3 is a cross-sectional view taken generally along the plane 3—3 of FIG. 2;

FIG. 4 is a bottom plan view of the valve illustrated in FIG. 3;

FIG. 8 is a cross-sectional view of a second embodiment of the coacting fill valve for use when inflating a dunnage bag with a gas injection device in accordance with the method of the present invention;

FIG. 8A is a reduced bottom plan view of the lower flexibly hinged biasing structure of the fill valve illustrated in FIG. 8;

FIG. 9 is a partial plan view of the bottom of a second embodiment of the gas injection device;

FIG. 10 is a cross-sectional view of the second embodiment of the coacting gas injection device shown engaged with the second embodiment of the fill valve for filling a dunnage bag;

FIG. 11 is a partial side view of a third embodiment of the gas injection device;

FIG. 12 is a partial plan view of the bottom of the third embodiment of the gas injection device illustrated in FIG. 11;

FIG. 17 is a graph illustrating the relationship between filling time and inflation pressure for a nominal 5 psi gauge design pressure dunnage bag for different types of injection devices; and FIG. 18 is a graph illustrating the relationship between filling time and inflation pressure for a nominal 8 psi gauge design pressure dunnage bag for different types of injection devices.

DESCRIPTION OF THE PREFERRED EMBODIMENTS

Figure 5:
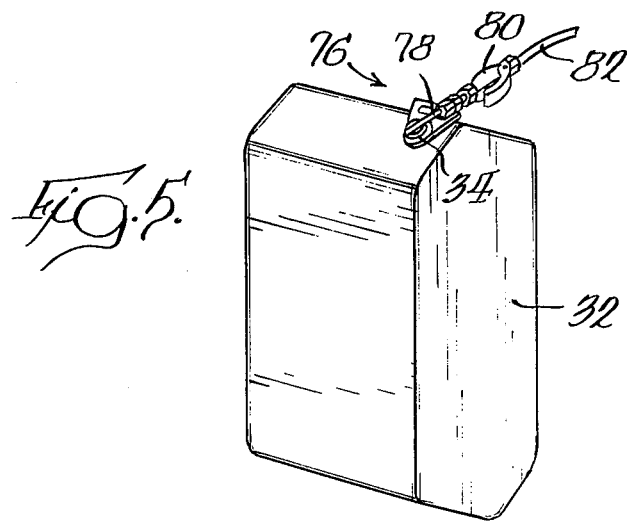
FIG. 5 is a perspective view of the dunnage bag illustrated in FIG. 1 showing a first embodiment of the gas injection device engaged with the fill valve device.

While this invention is susceptible of embodiment in many different forms, there are shown in the drawings and will herein be described in detail preferred embodiments of the apparatus for performing the method of the invention. It should be understood, however, that the present disclosure is to be considered as an exemplification of the principles of the invention and is not intended to limit the invention to the embodiments illustrated.

In the following description, two-digit numerals are used to refer to the embodiment illustrated in FIGS. 1–7, three-digit numerals in the 100 series are used to refer to the embodiment illustrated in FIGS. 8–10, three-digit numerals in the 200 series are used to refer to the embodiment illustrated in FIGS. 11 and 12, three-digit numerals in the 300 series are used to refer to the embodiment illustrated in FIG. 13, and three-digit numerals in the 400 series are used to refer to the embodiment illustrated in FIG. 14. The same last two digits in each numeral designate similar or functionally analogous elements in the various embodiments.

For ease of description, the apparatus used with the method of this invention will be described in a horizontal operating position, and terms, such as, upper, lower, horizontal, etc., will be used with reference to this normal operating position. It will be understood, however, that the apparatus may be manufactured, stored, transported, sold and used in orientation other than the position described.

Referring now to FIG. 1, there is illustrated a typical inflatable dunnage bag 32 having, on one end, a fill housing or valve device 34 adapted to coact with a gas injection device or air gun (not illustrated in FIG. 1) in accordance with the method of the present invention. Typically, the dunnage bag is a multi-ply bag and is made of a plurality of plies of paper, such as, Kraft paper, which form an outer shroud around a heat sealable inner, thermoplastic, film-like liner, or bladder. It is to be understood, however, that the method of the present invention may be used with many other types of disposable and non-disposable inflatable dunnage bags, such as those discussed above in the section entitled "Background of the Invention."

Some types of dunnage bags are manufactured in different sizes having different inflated internal volumes and typically may be designed for light, medium, and heavy-duty use. For example, the assignee of this invention manufactures three sizes of dunnage bags, each using a different number of plies of paper. Bags having two plies of paper are used for light-duty use and have a nominal allowable, or design, fill pressure of three pounds per square inch gauge. A medium-duty bag has four plies of paper and a nominal design pressure of five pounds per square inch gauge. The heavy-duty bag has six plies of paper and a nominal design pressure of eight pounds per square inch gauge.

For purposes of economy of manufacture, uniformity of appearance, and convenience under field use conditions, the dunnage bag fill housing 34 is preferably located in the same position on the three sizes of bags and has the same exterior dimensions. The use of valves having the same exterior dimensions for all three types of bags has a further advantage in that, when the dunnage bags are filled by means of the coacting gas injection device and fill valves in accordance with the method of the present invention, the same size gas injection device can be used for all three types of bags as will be explained in more detail hereinafter.

In accordance with the method of the present invention, the fill housing 34 is not required to have a valve member or valve means or valve closure member. Actually, it is possible, using the method of the present invention, to fill an inflatable dunnage bag through a housing mounted in a wall of the dunnage bag and extending from the exterior of the bag to the interior of the bag where the housing defines a smooth-walled chamber having an exterior opening in a portion of the housing on the exterior of the bag and an interior opening in a portion of the housing communicating with the interior of the bag. Before describing in further detail the various embodiments of the fill housing and coacting gas injection device, the general method of the present invention will first be discussed.

Specifically, the method of the present invention can be effected with the above-described fill housing 34 by introducing a jet, or jets, of high pressure gas or air into or over the exterior opening of the housing and aligning the jets with the chamber so that the jets are discharged substantially parallel to the longitudinal axis of the chamber and so that the jets are preferably spaced inwardly of the periphery of the chamber's exterior opening whereby they can pass through the chamber into the interior of the dunnage bag. By appropriate spacing of the high pressure gas jets relative to the exterior opening of the housing, the ambient air surrounding the jets above the housing is allowed a substantially unobstructed free flow passage toward the jets and into the chamber of the housing. A jet pump effect is created whereby the ambient air is entrained or aspirated into the dunnage bag. Specifically, as the gas jets expand through the chamber, the velocity reaches a maximum in the chamber or in the narrowest portion of the chamber. In accordance with Bernoulli's Principle, the pressure in the high velocity portion of the chamber is substantially reduced (to a subatmospheric pressure value) and ambient air is thereby drawn, entrained, or aspirated, through the chamber.

The ambient air can be characterized as flowing under the driving force of the pressure differential between the ambient air atmospheric pressure and the subatmospheric pressure created in the high velocity portion of the chamber. The flow of ambient air into the dunnage bag is said to be aspirated, or entrained with the gas jet, into the bag. It is to be realized that the term ambient air, as used in this specification, and in the appended claims, refers to the atmospheric air outward of the interior opening in the housing in the dunnage bag. Thus, with an appropriate size chamber, the high pressure gas jet could originate or issue from a discharge point within the chamber per se, which chamber would partially define a region of ambient air about the gas jet discharge point outward of the interior opening into the bag. The gas jet would then pass through this region of ambient air and then through the remaining inward portion of the chamber. Of course, in such a situation, the chamber must be in communication with the ambient air exterior to the chamber or housing so that virtually a limitless supply of ambient air at substantially atmospheric pressure can flow into the chamber as required.

On the discharge side of the chamber (i.e., inside of the dunnage bag), there are no walls to restrict lateral expansion of the air flowing into the bag and the velocity of the flowing fluid mixture decreases (as it must if the maximum flow rate is to remain equal throughout the length of the valve). To the extent that the valve chamber may have a diverging section opening into the interior of the bag, the pressure will increase in that section as the velocity decreases. That is, the velocity will be converted back to pressure in that section. Theoretically, the jet pump effect should be typically more pronounced when the housing has a typical thermodynamic nozzle configuration comprising a converging inlet, a minimum diameter throat area, and a diverging discharge section.

As a practical matter, it is preferable to provide a fill housing 34 with an integral valve closure member to maintain the bag in the inflated condition following pressurization of the bag in accordance with the method of the present invention. The fill valve device 34 illustrated in FIGS. 1, 2, and 3 represents such a combination air injection fill housing and valve closure member and will now be further described.

As illustrated in FIGS. 1, 2, and 3, the fill valve device 34 has a housing 36 mounted in, and extending through, the wall of the dunnage bag. Preferably, the housing is substantially cylindrical and fabricated from polyethylene. FIG. 3, which shows the valve device 34 mounted in the wall of the dunnage bag, best illustrates the dunnage bag wall structure of six plies of Kraft paper 40 which form the outer shroud around a thin, polyethylene bladder 42 (which is typically from 4 to 6 mils in thickness).

A handle 38 extends from the housing 36 on one side of the valve 34 and can be used for carrying the dunnage bag, as well as for locating the dunnage bag between cargo articles. The handle structure 38 is seen to be an essentially flat sheet (typically polyethylene) lying directly on top of the outermost one of the plies 40. A polyethylene lockwasher 44 may be snapped into place around the housing 36 below an annular shoulder 45 in the housing 36 to retain the valve in the dunnage bag.

The valve is specifically designed to provide a passageway of relatively large cross-section to accommodate flow of air or other gases from the exterior to the interior of the bag. The housing 36 defines a substantially cylindrical chamber 46 extending from an opening on the exterior of the bag to an opening on the interior of the bag. The chamber preferably has a slanted or frustoconical inlet wall 48, a straight, or right cylindrical throat wall 50 and a slanted or frustoconical outlet wall 52.

A removable cap 54 may be provided to cover the exterior opening of the chamber 46 at the inlet wall 48 and is preferably adapted to sealingly engage the inlet wall 48 to prevent leakage of air from the bag after the bag has been inflated. To this end, an O-ring 56 may be provided on the inner surface of the cap 54 for compressively sealing against the frustoconical inlet wall 48.

Preferably, the housing 36 and cap 54 are adapted to threadingly engage whereby the cap 54 can be screwed tightly onto the housing 36 to form an effective seal. The outwardly slanting frustoconical shape of the inlet wall 48 and the mating configuration of the cap 54 permits transference of a portion of the downward threading force directly against, and normal to, the slanted inlet wall 48 to assure sufficient compression of the O-ring 56, and as a consequence, provides a more effective seal. It has been found that if the slanted inlet wall 48 forms a large angle with respect to the vertical (say 60° or more), there is less chance that a good seal will be formed than if the angle is less than 45°.

After the method of the present invention has been used for inflating and pressurizing a dunnage bag, it is necessary that some means be provided for preventing flow of the air out of the dunnage bag. To this end, a variety of manual and automatic (including power-actuated) valve closure devices can be effectively used to block the air flow when the air injection device is withdrawn from the dunnage bag fill housing. The valve closure need only provide a temporary seal if an outer cap is used to seal the fill housing after the air injection device is withdrawn.

There is illustrated in FIGS. 2 through 4 a preferred first embodiment of a fill housing or fill valve having a valve closure means to block flow from the bag when the bag is inflated. A generally flat, flexibly hinged mounting means 60 is disposed within the interior portion of the bag and biases the valve means, such as an annular sealing ring 62, against the portion of the housing 36 defining the interior opening of the chamber 46.

Specifically, as illustrated in FIG. 4, a lower biasing disc or circular flexible sheet 64 is provided with three tabs 66 which are then secured, as by friction welding, mechanical attachment, or heat sealing, to tabs 68 which project from a circular flange 70 at the bottom of the housing 36. The upper surface of the flange 70 is secured, as by heat sealing, to the underside or inside surface of the bladder 42 to provide an airtight seal between the inside of the bladder and the valve housing 36.

In operation, when the flexible sheet 64 is moved downwardly away from the valve housing 36 to open the valve, as will be explained hereinafter, the peripheral edges of the sheet 64 between the three tabs 66 separate from the peripheral edge of the overlying flange 70 to provide passages into the dunnage bag. The biasing disc or circular flexible sheet 64 preferably also includes a disc-like central portion or thickened reinforced central portion 72 to provide a stiffer and more rigid backing for the sealing ring 62 to thereby effect a better seal.

For opening the fill valve device 34 in response to engagement with the air injection device, as will be described in detail hereinafter, a stem means or valve stem 74 is preferably secured, or integral with, the central portion 72 of the circular flexible sheet 64. The stem 74 is centered within the chamber 46 and projects upwardly into the exterior opening of the housing 36.

It can be seen that the unique construction of the valve means 62, in combination with the flexibly hinged mounting means 60, provides a substantially flat valve structure which permits the bag, when deflated, to lie generally flat. Further, the unique flexibly hinged mounting means 60 provides proper valve closure biasing action without the use of the typical helical springs that are often used in valves on inflatable objects. Further, the flexibly hinged mounting means 60 and the other valve components, such as the circular flexible sheet 64 and the valve housing 36, can all be made from relatively inelastic and sturdy polyethylene which can be easily molded into the proper configuration and can be easily heat sealed where necessary to form the valve construction illustrated. It should also be noted that the flexible circular sheet 64 provides a baffle for deflecting incoming air to prevent impingement of the air on the portion of the wall of the thin, film-like bladder opposite the valve. Most importantly, the fill valve device 34 has an interior chamber 46 which provides a relatively large annular volume around the slender stem 74 to accommodate entrainment of ambient air through the valve and into the bag in cooperation with the coacting gas injection device in accordance with the method of the present invention as will next be described.

A gas injection device or gun, designated generally by the numeral 76 in FIG. 5, is shown mounted on the valve 34 of a dunnage bag 32 during inflation of the dunnage bag. A pressurized gas conduit means or tube means for supplying pressurized gas, such as tubular member 78, is connected on one end to a conventional handoperated pressurized gas supply on-off valve 80 which in turn is connected to a pressurized gas supply hose 82. The tubular member 78 may alternatively be directly connected to a source or supply of pressurized gas and may specifically be connected directly to the hose 82. An on-off valve, such as valve 80, may be located upstream in the hose or at a supply of pressurized gas, such as at a compressor or compressed air receiving tank. The valve 80 may be integral with the locator prong 92 for automatic opening when the gun is engaged with the valve. Alternatively, an on-off valve need not be used at all. In that case, pressurized gas can be continually discharged from the air injection device.

Figure 6:
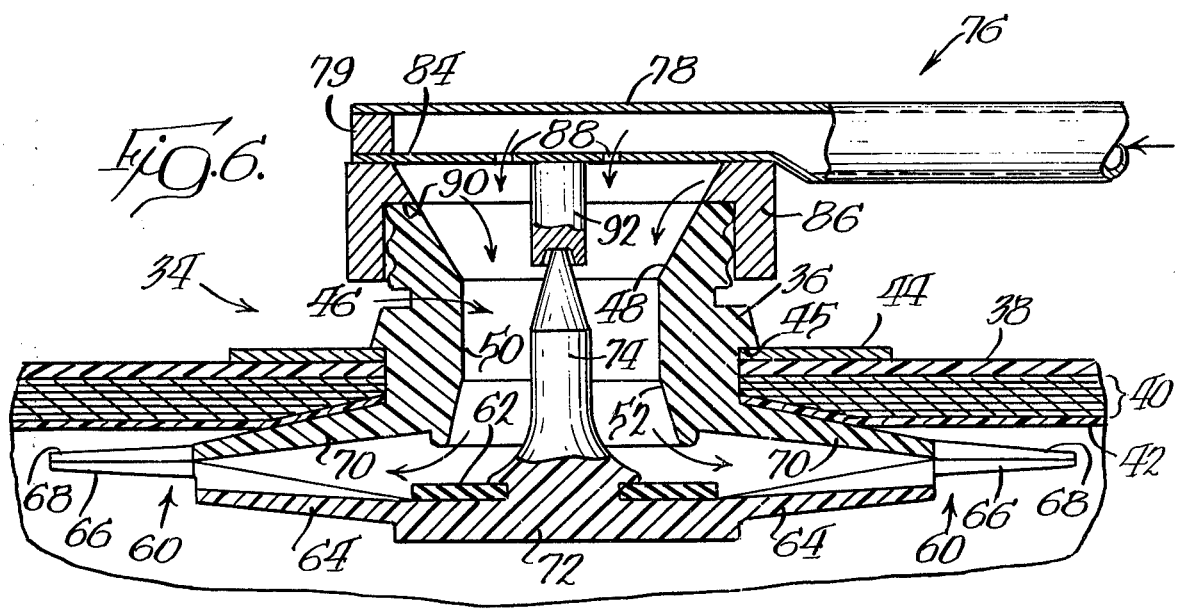
FIG. 6 is an enlarged cross-sectional view of the gas injection device and fill valve device illustrated in FIG. 5.

With reference to FIG. 6, the tubular member 78 is seen to be a substantially hollow tube which is plugged or closed at the end 79 opposite the connection to the pressurized gas supply. As best illustrated in the bottom view of FIG. 7, four orifices 88 are provided at equally spaced intervals about the perimeter of a circle in the tubular member 78 for discharging jets of pressurized gas into the dunnage bag valve. To position the tube 78 properly over the housing 36, a ring-like alignment frame 86 is mounted across its diameter to the tube 78 so that it is concentric with the circle of orifices 88. The alignment frame 86 has an annular shoulder 90 which is adapted to seat on, and engage the top of, the exterior portion of the housing 36. When the alignment frame 86 is thus engaged, the circle of orifices is concentric with the circular interior walls of the valve housing 36 and the center of the circle of orifices 88 is substantially coincident with the longitudinal axis of the cylindrical housing 36. A portion of the wall of the tube is flattened, as at 84, to accommodate the attachment of the alignment frame 86. The flattened section 84 further permits easier drilling of orifices 88 through the tube wall. As a result of the orifices 88 being drilled in the flattened section 84, the jets of pressurized gas discharge from the orifices in a substantially parallel relationship.

The ring-like structure of the alignment frame 86 maintains the orifices 88 within a region of freely flowable ambient air and permits free flow of ambient air past the exterior portions of the tube 78 as well as between the exterior portions of the tube 78 and the exterior portions of the valve housing 36. Thus, ambient air can be drawn into the region surrounding the orifices 88 and, under influence of the Bernoulli effect caused by the jets of high pressure gas discharging from the orifices 88 through the valve chamber 46, can be drawn, entrained, or aspirated, through the valve and into the dunnage bag. This action is efficiently promoted by using relatively small orifices having a relatively small combined cross-sectional flow area whereby the amount of high pressure air (or other gas) required to inflate the dunnage bag is considerably less than the amount of high pressure air required by filling devices which use only high pressure air. The efficiency is further effected by locating the orifices 88, in relation to the valve chamber 46, so that the orifices 88 are spaced from the walls of the chamber. The number of orifices and their size may be varied as desired to achieve the most efficient entrainment of ambient air for a given set of fixed conditions (e.g., a fixed valve size and shape and a fixed high pressure gas flow rate). For example, only one orifice may be provided and it may be located off-center with respect to the longitudinal axis of the valve housing 36. Alternatively, two or more orifices may be asymmetrically arranged to discharge into the chamber 46. A single orifice means, such as an annular slit, could also be used.

The efficient entrainment of ambient air is further effected by a continuous, smooth flow surface from the valve to the alignment frame. Specifically, in FIG. 6 it can be seen that the inside surface of the ring-like frame 86 above shoulder 90 is frustoconical and has a conical angle identical to that of the mating frustoconical valve inlet section 48 to form a continuous, and extended, flow surface.

In order that the jets of high pressure gas and the entrained air can be passed through the valve and into the dunnage bag, the valve closure or annular sealing ring 62 must be moved away from sealing engagement with the interior opening of the valve housing. To this end, a prong means or prong 92 is secured to the flattened wall portion 84 of the tube 78 at the center of the circle of orifices 88 and extends downwardly to engage and depress the stem 74 when the air gun is mounted on the valve housing 36 and aligned with the chamber 46 for discharging jets of pressurized gas therein. When the stem 74 is thus depressed, the incoming air and/or gas can pass between the circular flexible sheet 64 and the valve housing flange 70 and then out through the openings at the periphery of the flange 70 and circular flexible sheet 64, between the three pairs of flexibly hinged tabs 66/68, as is best illustrated in FIG. 6.

Of course, it is to be understood that a dunnage bag can be inflated in accordance with the method of the present invention even though the fill housing may not have a self-closing or automatically closing valve means. However, to maintain the bag in the inflated, pressurized condition, it is necessary to prevent the pressurized air from escaping from the bag. To this end, it is preferable to have a valve closure means integral with the fill housing as previously described. However, other types of closure means could be provided. For instance, instead of having a circular flexible sheet 64 and valve means or annular sealing ring 62 as illustrated in FIG. 6, a separate, manually actuated valve means could be used. Such a valve means might consist of a pivoting or sliding closure member which could be moved into position to block flow out of the dunnage bag through the chamber 46 after the dunnage bag design fill pressure level had been reached. Also, a separately power-actuated valve closure member could be employed that would close the valve in response to either an initiation action by the operator or automatically, upon sensing of a predetermined pressure level within the dunnage bag.

Other types of valve means or closure members that can be used with the fill housing device are described in the previously cited application of Angarola et al. entitled "Dunnage Bag Fill Valve" and attention is directed thereto, with specific reference to FIGS. 8-14.

When the inflation air gun device and fill valve device are engaged to coact to inflate a dunnage bag in accordance with the method of the present invention, a most useful and advantageous phenomenon is effected. Specifically, it has been found that for a given size and shape air gun, the size and shape of the valve can be designed so as to permit the filling of a dunnage bag with entrained ambient air up to a specific stabilized maximum pressure level, but not in excess of that level. In particular, if the inflation air gun is engaged with a dunnage bag fill valve and is left injecting high pressure gas or air jets therein, the pressure within the bag will reach a certain level, at which time the pressure will not increase any further. Though the high pressure gas jets and entrained ambient air would still be directed into the fill valve housing, an equilibrium is reached where the mass flow rate of air entering the valve equals the flow rate of air being discharged from, or deflected out of, the dunnage bag in response to the internal bag pressure. Thus, dunnage bags can be equipped with fill valves that are sized to coact with a particular construction of a single common air fill gun so that each dunnage bag can be filled only to its design pressure level and so that each dunnage bag cannot possibly be overpressurized so as to rupture. Experimental data relative to this phenomenon will be discussed following the description of other embodiments of the apparatus that can be used with the method of the present invention.

FIGS. 8 and 8A illustrate a second embodiment of a dunnage bag fill valve device 134. Certain features of this valve are also described in the previously cited concurrently filed application of Angarola et al., entitled "Dunnage Bag Fill Valve," and attention is directed thereto (especially to FIGS. 12-14). Like the first embodiment of the fill valve 34 previously described, valve 134 has a housing 136 mounted within the wall of a dunnage bag. The housing is substantially cylindrical and has an annular flange 137 which is secured, as by heat sealing, to the upper or exterior surface of a bladder 142. The flange 137 also functions to support and retain the plies 140 which lie immediately above it. An O-ring 153 is provided inside the bag at the end of the housing 136 and functions as a valve seat. A flexibly hinged mounting means 160 is used to secure a valve closure disc 164 across the interior opening at the bottom of the valve housing 136 to provide a valve closure. The valve closure disc 164 is reinforced in its central portion by a smaller circular sheet or disc 172. Spaced equally about, and extending outwardly from, the valve disc 164 are arms 173 which are secured to, or are integral with, a bladder attachment ring 175. The ring 175 is attached, as by heat sealing, to the underside, or inside surface, of the bladder 142. Preferably, the valve closure disc 164, the circular reinforcing sheet 172, and the arms 173 are made of polyethylene. The closure 164 is biased against the interior opening of the valve housing 136 by the flexibly hinged means or hinge connection 160 where the arms 173 join the bladder attachment ring 175. Thus, if the valve closure disc 164 were pushed downwardly away from the interior opening of the fill valve housing 136, the arms 173 would be pulled away from the wall of the bladder 142 also. To some extent, the wall of the bladder 142 would be pulled inwardly at the point of attachment to the ring 175 to contribute some amount of the flexible hinge action.

To open the valve 134 and allow passage of air therethrough as just described, a stem means 174 is provided in the interior chamber of the valve housing 136 and is adapted to be engaged by an air gun or gas injection device as will be described hereinafter. The stem 174 is a hollow, substantially cylindrical member slidably disposed within the valve housing 136 and adapted for vertically reciprocable movement therein.

A cap 154 may be provided for threadingly engaging the valve housing 136 and the cap 154 may hold an O-ring 156 to bear against an exterior portion of the housing 136 to provide a secondary seal.

A second embodiment of the injection device or air gun is designed to be used with the fill valve illustrated in FIGS. 8 and 8A and is designated generally as 176 in FIGS. 9 and 10. Like the first embodiment illustrated in FIGS. 6 and 7, the air gun 176 has a hollow cylindrical tube 178 for supplying pressurized gas or air to the fill valve and has a ring-like alignment frame 186 disposed at one end of the tube and mounted across its diameter to the tube. In the tube 178, at the center of the ring-like frame 186, an orifice 188 is provided for emitting a jet of pressurized gas or air. When the gun 178 is engaged with the dunnage bag fill valve 134, as illustrated in FIG. 10, the ring-like frame 186 fits around the periphery of the exterior portion of the valve 134 and aligns the orifice 188 in the center of the valve chamber so that the jet of pressurized gas or air exiting from the orifice 188 is directed into and through the valve 134. When the gun 176 is engaged with the valve 134, it must be pushed downwardly to move the stem 174 into the valve to push the valve disc 164 away from the interior opening of the valve and allow passage of the entrained ambient air therethrough. To this end, the bottom portion of the stem 174 is provided with apertures, such as the aperture 189, illustrated in FIGS. 8 and 9, through which the incoming air flows as it passes into the dunnage bag.

Figure 7:
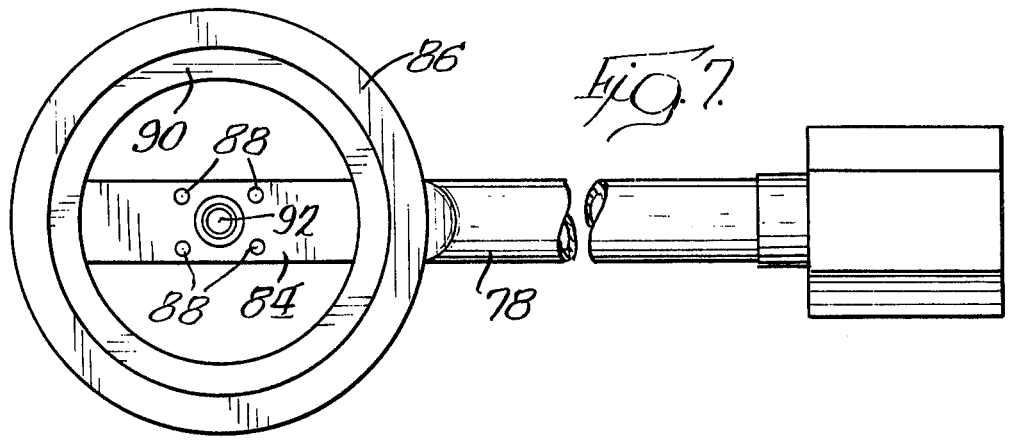
FIG. 7 is a bottom plan view of the gas injection device.

As can be seen, the second embodiment of the air gun 176 illustrated in FIGS. 9 and 10 has certain advantages compared to the first embodiment illustrated in FIGS. 6 and 7. Specifically, owing to the particular construction of the dunnage bag fill valve 134, there is no need to have a prong member or prong means, such as prong 92 on the air gun 76 illustrated in FIG. 6.

A third embodiment of the injection device or air gun for use with the method of the present invention is illustrated in FIGS. 11 and 12. The third embodiment is designed to be used with the second embodiment of the dunnage bag fill valve illustrated in FIGS. 8 and 10, that is, one that does not have a central stem means for actuating a valve closure means. The third embodiment of the air gun has a substantially hollow, cylindrical extension tube 278 with a fitting (not illustrated) on one end for connection to an air hose and a tip tube 279 disposed at a substantially right angle to the extension tube 278. As best illustrated in FIG. 12, the tip tube 279 has an orifice 288 in its distal end for the discharge of a gas or air jet. The gun is aligned over the dunnage bag fill valve with a mounting ring 286 which is secured to the tip tube 279 by a plurality of outwardly and downwardly extending legs 287. A shoulder 290 is provided within the alignment ring 286 for engaging the top portion of the dunnage bag fill valve stem such as the top portion of stem 174 illustrated in FIG. 8.

Another type of gas injection device or gun is illustrated in FIGS. 24 through 26 of the previously cited application of Angarola et al. entitled "Dunnage Bag Inflation Air Gun" and reference is directed thereto. This type of gun has a novel ambient air passageway which defines a confined ambient air flow path or region in which the ambient air is free to flow towards, and around, the gas jet discharge orifices.

Other modifications to a gas injection device relating to the use of screens to prevent entrainment of particulate matter and to the use of blow-back telltale mechanisms are described in the previously cited application of Angarola et al., entitled "Dunnage Bag Inflation Air Gun" and reference is directed thereto.

Figure 13:
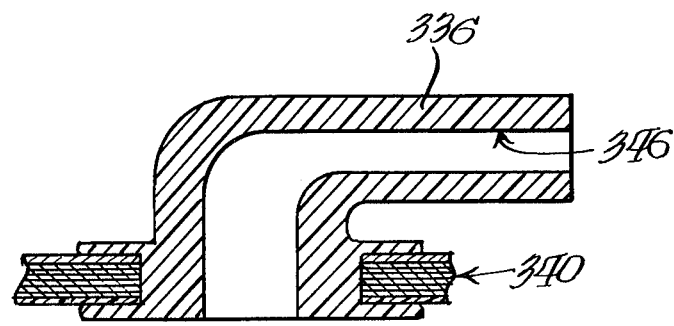
FIG. 13 is a cross-sectional view of another embodiment of a coacting fill housing for use when inflating a dunnage bag with a gas injection device in accordance with the method of the present invention.

Another modification of the fill housing is illustrated in FIG. 13. The housing 336 is mounted in the wall 340 of a dunnage bag. The housing 336 has two substantially cylindrical portions at a right angle to each other. A substantially circular cross section chamber 346 is defined in the housing and communicates between the exterior and interior of the bag. The bag may be inflated through housing 336 with an air gun, such as those embodiments previously described and illustrated in FIGS. 5–7 and 10–12. The fact that the housing 336 is "angled" so that a portion is parallel to the bag wall has advantages in certain "low-clearance" applications where dunnage bags are regularly used in a particular orientation. Though a valve member is not illustrated with housing 336, it is to be understood that a valve member of appropriate design may be incorporated.

Figure 14:
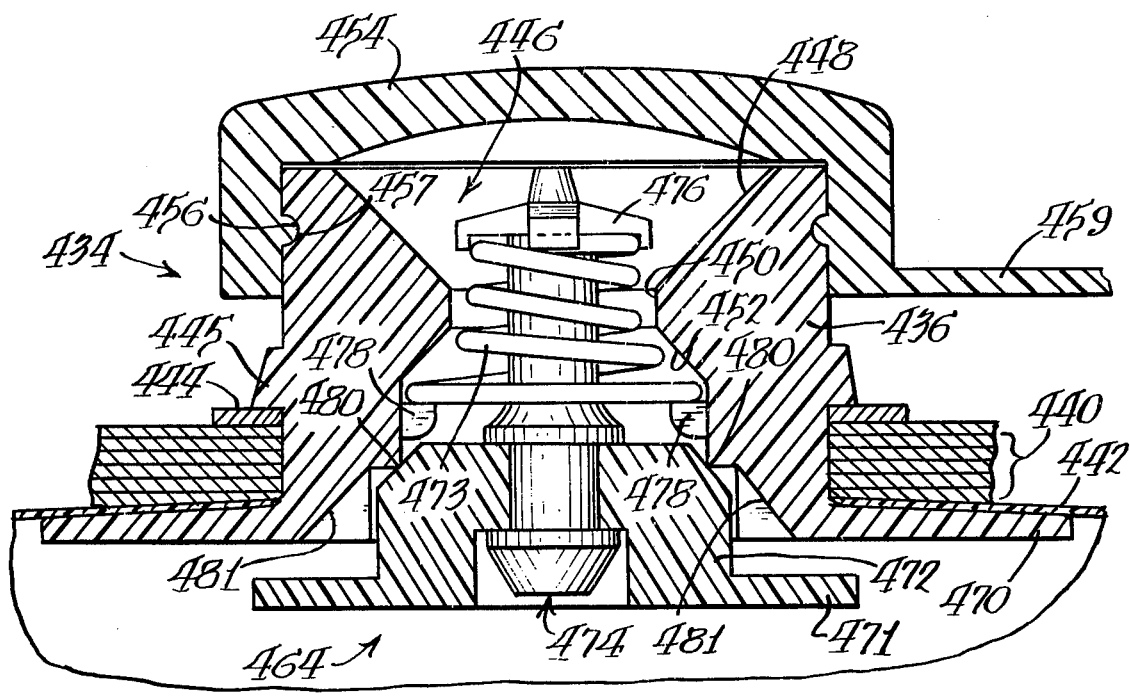
FIG. 14 is a cross-sectional view of still another embodiment of a coacting fill housing for use when inflating a dunnage bag with a gas injection device in accordance with the method of the present invention.

Another modification of the fill housing for use with the method of the present invention is illustrated in FIG. 14 and is generally designated therein by numeral 434. The device 434 has a substantially cylindrical hollow housing 436 mounted in, and extending through, the wall of a dunnage bag, which is indicated as being six pieces of Kraft paper 440 forming an outer shroud around a thin polyethylene bladder 442. A lock washer 444 may be snapped into place around the housing 436 below an annular shoulder 445 to retain the valve in the dunnage bag.

A circular flange 470 is provided at the bottom of the housing 436. The upper surface of the flange 470 is secured, as by heat sealing, to the underside or inside surface of the bladder 442 to provide an airtight seal on the inside of the bladder and the valve housing 436.

The valve is specifically designed to provide a passageway of relatively large cross section to accommodate flow of air or other gases from an injected stream to the interior of the bag. The housing 436 defines an interior chamber 446 extending from an opening on the exterior of the bag to an opening in the interior of the bag. The chamber preferably has a slanted or frustoconical inlet wall 448, a straight or right cylindrical throat wall 450, and a slanted or frustoconical diverging wall 452.

A removable cap 454 may be provided to cover the inlet opening of the chamber 446 and is preferably adapted to sealingly engage the housing 436 to prevent leakage of air from the bag after the bag has been inflated. The cap 454 has an inner vertical wall with an annular snap-in flange 456 for being received by an annular channel 457 in the housing 436 to lock the cap in place over the housing 436. The cap 454 may further be directly connected to the housing 436 or another portion of the dunnage bag by means of a strap 459 (the connection of the strap to the housing or dunnage bag is not illustrated).

Disposed within the housing 436 is a valve member 464 which sealingly engages the outlet opening of the valve housing 436. The valve member 464 comprises a stem 474, a plug portion 472, and a bias spring 473. The bias spring 473 is engaged, on one end, by a cruciform shaped retainer 476, and on the other end, by an annular flange 478 projecting onto the chamber 446 from the housing 436. Bias spring 473 is mounted under compression between the retainer 476 and flange 478 and therefore continuously biases the valve member 464 upwardly so that the plug portion 472 sealingly engages the outlet of the valve housing 436, such as at seating edge 480. The plug portion 472 preferably has an annular flange 473 which projects outwardly and overlies a portion of the valve housing 436 to provide a baffle which deflects the incoming air stream when the valve is opened and air is being injected therethrough.

The dunnage bag may be inflated through the housing 436 with an air gun, such as the embodiment previously described and illustrated in FIGS. 5–7, in a manner previously described with reference to FIGS. 5 and 7.

For a given size dunnage bag and for a given available gas or air supply pressure, the gun and valve apparatus can be judiciously designed to (1) establish the maximum stabilized pressure level to which the bag can be filled and (2) optimize the length of time required to fill a dunnage bag to a specific pressure level. The principles of such design can be best explained with reference to the schematic representation in FIG. 15. A dunnage bag fill housing or valve is schematically represented and designated by the numeral 534. The valve 534 is mounted in the wall 540 of a dunnage bag. The valve housing is substantially cylindrical and defines an interior chamber 546 which has a frustoconical converging wall structure or inlet 548, a substantially cylindrical wall structure or throat 550 at the minimum cross-sectional area of the chamber 546, and a frustoconical diverging wall structure or outlet 552. An air inflation gun is schematically represented as having a tube portion 578 with an orifice 588.

Figure 15:
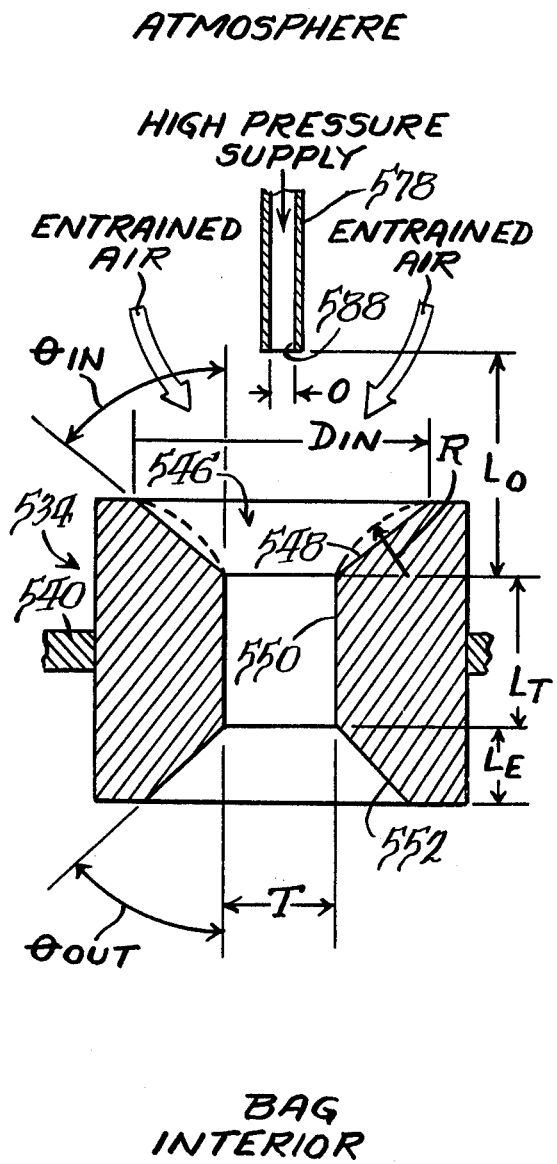
FIG. 15 is a schematic representation of the third embodiment of the gas injection device and coacting fill valve used in accordance with the method of the present invention.

Experiments have been conducted with injection devices and valves as schematically represented in FIG. 15 wherein a number of the physical parameters were varied. Specifically, experiments were conducted to determine how changes in the number of gun orifices, the orifice size, and the orifice configuration affect the dunnage bag maximum stabilized pressurization level and the time required to fill a given dunnage bag to its maximum stabilized pressurization level.

Experiments were conducted to determine the relationship between dunnage bag filling time and the maximum stabilized pressurization level as a function of the inlet shape of the fill valve.

Tests were performed with different types of gun structures for a given value having a 45° converging inlet to determine the effect of gun structure on the maximum stabilized pressurization level. A multi-orifice gun similar to that illustrated in FIGS. 5 through 7 was compared with a single orifice gun similar to that illustrated in FIGS. 11 and 12. The multi-orifice gun had four orifices equally spaced about a 0.25 inch diameter circle (as best illustrated in FIG. 7), each having a diameter, 0, of 0.073 inch. The single orifice gun had a orifice diameter, 0, of 0.156 inch. The other parameters such as hose length, high pressure air supply pressure, orifice distance $L_o$, and the valve remained constant. Specifically, the guns were connected to a 10-foot length of standard three-eighths inch nominal inside diameter air hose and supplied with air at 80 psi gauge on the upstream end of the hose (the pressure at the gun inlet was 62 psi gauge under full flow conditions). The valve was mounted in a 6-ply dunnage bag having an internal inflated volume of 11.76 cubic feet and a nominal design pressure of 8 psi gauge. With reference to FIG. 15, the valve used in the test had a throat diameter, T, of 0.456 inch, an outlet angle $\theta_{OUT}$, of 30°, a throat length $L_T$, of 0.156 inch, and an exit length, $L_E$, of 0.25 inch. It was found that the multi-orifice gun provided a higher stabilized pressurization level (about 10 psi gauge) than the single orifice gun when using a 45° inlet on the valve. Further, it was found that the multi-orifice gun operated more quietly. It should be noted that better performance characteristics are obtained with the multi-orifice gun even though it has a total cross-sectional jet flow area of the four 0.073 inch diameter orifices that is less than the cross-sectional jet flow area of the single orifice gun having the 0.156 inch diameter orifice.

Tests were performed to determine the effect of varying the gun structure on the maximum stabilized pressurization level for the three types of bags. Two types of gun configurations, both corresponding generally to the multi-orifice first embodiment illustrated in FIGS. 5 through 7, were used in this test. Bag pressure versus filling time was plotted for the 3 psi, 5 psi, and 8 psi nominal design pressure bags in FIGS. 16 through 18, respectively, for the two types of guns. In those figures, curve A represents a gun having four orifices equally spaced about a 0.25 inch diameter circle (as best illustrated in FIG. 7), each having a diameter, 0, of 0.098 inch and the curve labeled B represents a gun having a construction identical to the gun of curve A except that the orifice diameter, 0, is 0.073 inch. Each gun was connected to a 10-foot length of standard three-eighths inch nominal inside diameter air hose and supplied with air at 80 psi gauge on the upstream end of the hose. The pressure of the gun inlet under full flow conditions was 55 psi gauge for the 0.098 inch orifice gun (Curve A) and was 63 psi gauge for the 0.073 inch orifice gun (Curve B). All three of the bags had the same volume of 11.76 cubic feet. The valves used with the three bags were of the type illustrated for the first embodiment in FIGS. 5 through 7 having a 45° converging inlet section and an inlet diameter, $D_{IN}$, of 0.906 inch. Referring to FIG. 15, for the 3, 5, and 8 psi nominal design bags the throat diameter, T, was 0.625 inch, 0.531 inch, and 0.421 inch, respectively, and the distance from the top of the throat to the gun orifice, $L_o$, was 0.266 inch, 0.312 inch, and 0.367 inch, respectively.

As can be seen from the three figures, the gun having the larger diameter orifices (as represented by curve A) effected a greater maximum stabilized pressurization level for each bag than the gun having the smaller 0.073 inch diameter orifices. However, it should be noted that in all cases, the pressures achieved were greater than the nominal design pressure. For example, in FIG. 16 (3 psi bag) curve A shows a maximum stabilized pressurization level of 6.1 psi and curve B shows a maximum stabilized pressurization level of 4.25 psi. Both of these levels are above the nominal 3 psi design pressure. By appropriate changes to one or more of the parameters affecting the gun and/or the valve, the maximum stabilized pressurization level can be reduced to the 3 psi level. For example, the air pressure could have been reduced, or the orifice diameter could have been reduced, or the valve shape and size could have been changed.

Figure 16:
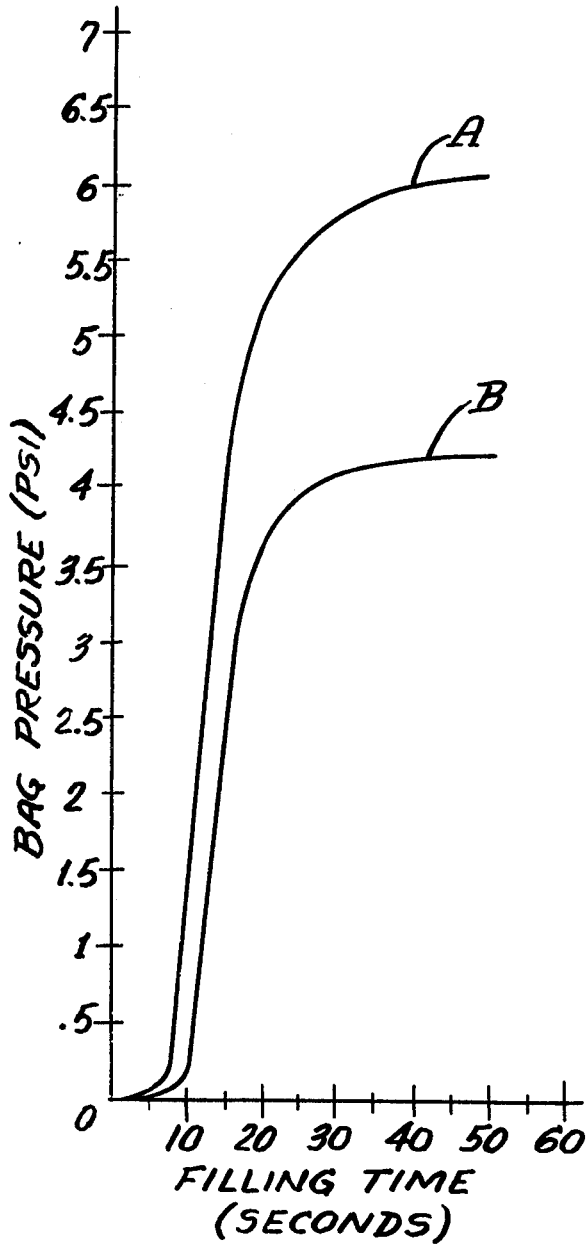
FIG. 16 is a graph illustrating the relationship between filling time and inflation pressure for a nominal 3 psi gauge design pressure dunnage bag for different types of injection devices.

The curves in the graphs in FIGS. 16 through 18 illustrate another interesting characteristic of the method of the present invention. It can be seen that a significant parameter affecting the maximum stabilized pressurization level is the throat diameter of the dunnage bag fill valve. Specifically, the smallest throat diameter is 0.421 inch for the 8 psi bag which was pressurized to the highest level, about 10 psi. The largest throat diameter is 0.625 inch for the 3 psi bag which had the lowest stabilized pressurization level, about 4 psi. Thus, the smaller the throat diameter of the valve chamber, with all the other parameters fixed, the higher the maximum stabilized pressurization level. This characteristic allows an air injection device of one specific configuration and size to be used with a variety of dunnage bags having different design or nominal design pressure levels whereby each dunnage bag can be inflated to the predetermined maximum stabilized pressure level corresponding to the safe design limit. And further, the characteristic permits the valves that are used in the variety of dunnage bags to have the same exterior size and shape with the only difference being the diameter of the interior throat section.

It has been found that one gun can be used to fill three different size dunnage bags. In particular, it was desired to inflate 6-ply, 4-ply, and 2-ply dunnage bags, each having a volume of 11.76 cubic feet, to their nominal design pressure rating of 8 psi, 5 psi, and 3 psi, respectively. The bags were equipped with fill valves similar to the one illustrated in FIGS. 1 through 4. With reference now to FIG. 15, the inlet angle, $\theta_{IN}$, was set at 45° for all bags and the outlet angle, $\theta_{OUT}$, was set at 30° for the 6- and 4-ply bags and at 15° for the 2-ply bag. The overall length of the valve, from the exterior opening to the interior opening was 0.65 inch for all three valves and the inlet diameter, $D_{IN}$, was 0.906 inch for all three valves. The throat diameter, T, was set at 0.421 inch, 0.531 inch, and 0.625 inch for the 6-, 4-, and 2-ply bags, respectively. The air inflation gun, identical in configuration to the gun 76 illustrated in FIGS. 5 through 7, was then developed to fill the 6-, 4-, and 2-ply bags to their respective nominal design pressures. The four orifice holes in the gun were equally spaced about 0.25 inch diameter circle and each hole had a diameter, 0, of 0.073 inch. When the gun was mounted on each valve, the orifices were maintained 0.125 inch above the valve by the alignment frame of the gun. The gun was supplied with air at 80 psi gauge static pressure at the upstream end of a 61-foot length of standard three-eighths inch nominal inside diameter air hose. The pressure at the gun under full flow conditions was 62 psi gauge. An 80 psi supply pressure and a 61-foot hose length would be typical for conditions encountered in the field. When such a gun was used to inflate the 6-, 4-, and 2-ply bags having the fill valves with dimensions described above, the bags were inflated to a safe allowable maximum stabilized pressurization level of 8.5 psi, 5.4 psi, and 3.5 psi, respectively.

Thus, it can be seen that the novel method of the present invention can be used with specific sizes of dunnage bags. By appropriate selection of the size and shape of the fill valve, orifice configuration, orifice size, orifice-to-valve distance, and supply air pressure, apparatus can be designed to effect any desired maximum stabilized pressurization level within the bags.

Of course, for ease of use in the field, it would be most convenient to use a single gun (with a standard length of hose and air supply pressure) that could be used to fill any of the three types of bags (each having an appropriately sized valve) to a stabilized pressurization level equal to the safe design pressure limit of each bag. However, it would be possible to use only one size and shape of valve in the different types of bags and to require the operator to vary the supply pressure to the air inflation gun as necessary (as predetermined by experiment) to automatically fill each bag to a stabilized pressurization level equal to the safe design pressure level for the particular bag. This is not to be recommended, however, since the operator could make a careless adjustment of the supply pressure and overpressurize a bag, thereby causing its rupture.

It should be understood that the novel gas injection method of the present invention could be used with suitably designed valves on many types of dunnage bags, including single ply (paper or non-paper) disposable bags and including reusable bags, such as those having a rubber, fabric, or plastic wall structure.

From the foregoing, it will be observed that numerous variations and modifications may be effected without departing from the true spirit and scope of the novel concept of the invention. It is to be understood that no limitation with respect to the specific method illustrated herein is intended or should be inferred. It is, of course, intended to cover by the appended claims all such modifications as fall within the scope of the claims.

We claim:

1. A method of filling an inflatable dunnage bag with entrained ambient air to a predetermined maximum stabilized pressurization level, said dunnage bag having a housing mounted in a wall of the bag and extending from the exterior of the bag to the interior of the bag, said housing defining a smooth-walled chamber having an exterior opening in a portion of the exterior of the bag and an interior opening in a portion of the housing communicating with the interior of the bag, said method comprising the steps of:

discharging at least one jet of pressurized gas from a discharge point located in a region of ambient air; and aligning each said gas jet to pass through at least part of said chamber in the direction from said exterior opening to said interior opening whereby ambient air is entrained with the jet through the chamber into the bag.

2. The method in accordance with claim 1 in which said step of discharging at least one jet of pressurized gas includes discharging a jet of pressurized gas into said chamber from a discharge point located in a region of ambient air outward of said chamber exterior opening.

3. The method in accordance with claim 1 including the further step of locating each said gas jet relative to said chamber with the cross-sectional flow area of all said jets in said chamber being not greater than the cross-sectional area of said chamber exterior opening.

4. The method in accordance with claim 1 including the further step of locating each said gas jet relative to said chamber with the cross-sectional flow area of all said jets in said chamber being less than the cross-sectional area of said chamber exterior opening.

5. The method in accordance with claim 1 in which the step of discharging at least one jet of pressurized gas includes discharging the gas in a conical flow stream from a circular orifice.

6. A method of filling an inflatable dunnage bag with entrained ambient air to a predetermined maximum stabilized pressurization level, said dunnage bag having a housing mounted in a wall of the bag and extending from the exterior of the bag to the interior of the bag, said housing defining a smooth-walled chamber having an exterior opening in a portion of the exterior of the bag and an interior opening in a portion of the housing communicating with the interior of the bag, said method comprising the steps of:

discharging a plurality of jets of pressurized gas with the discharge originating in a region exposed to freely flowable ambient air; and aligning said gas jets to pass through at least part of said chamber in the direction from said exterior opening to said interior opening whereby ambient air is entrained with said jets through the chamber into the bag.

7. The method in accordance with claim 6 in which said step of discharging said plurality of jets of pressurized gas includes discharging said plurality of jets of pressurized gas into said chamber from a discharge point located in a region of ambient air outward of said chamber exterior opening.

8. The method in accordance with claim 6 including the further step of locating said gas jets relative to said chamber with the sum of the cross-sectional flow areas of said jets in said chamber being not greater than the cross-sectional area of said chamber exterior opening.

9. The method in accordance with claim 8 in which all of the steps are performed substantially simultaneously.

10. The method in accordance with claim 6 further including discharging each jet in a conical flow stream from a separate circular orifice.

11. The method in accordance with claim 9 further including locating said orifices in spaced relationship from the walls of said chamber.

12. A method of filling an inflatable dunnage bag with entrained ambient air to a predetermined maximum stabilized pressurization level, said dunnage bag having a housing mounted in a wall of the bag and extending from the exterior of the bag to the interior of the bag, said housing defining a smooth-walled chamber having an exterior opening in a portion of the exterior of the bag and an interior opening in a portion of the housing communicating with the interior of the bag, said chamber oriented about a central longitudinal straight-line axis between said exterior and said interior openings, said method comprising the steps of:

positioning a pressurized gas supply conduit having at least one gas jet discharge orifice adjacent the walls of said chamber;

aligning said conduit to direct said gas jet through at least part of said chamber in the direction from said exterior to said interior opening;

locating said discharge orifice relative to said chamber so that the cross-sectional flow area of said jet in said chamber is not greater than the cross-sectional area of said chamber exterior opening; and discharging at least one jet of pressurized gas from said orifice in a region exposed to freely flowable ambient air whereby the ambient air is entrained from said region through the chamber into the bag.

13. A method of filling an inflatable dunnage bag with entrained ambient air to a predetermined maximum stabilized pressurization level, said dunnage bag having a housing mounted in a wall of the bag and extending from the exterior of the bag to the interior of the bag, said housing defining a smooth-walled chamber having an exterior opening in a portion of the exterior of the bag and an interior opening in a portion of the housing communicating with the interior of the bag, said chamber oriented about a central longitudinal straight-line axis between said exterior and said interior openings, said method comprising the steps of:

positioning a pressurized gas supply conduit having a plurality of gas jet discharge orifices spaced from the walls of said chamber;

aligning said conduit to direct said gas jets through at least part of said chamber in the direction from said exterior opening to said interior opening;

locating said discharge orifices relative to said chamber so that the sum of the cross-sectional flow areas of said jets in said chamber is less than the cross-sectional area of said chamber exterior opening; and discharging said jets of pressurized gas from said orifices in a region exposed to freely flowable ambient air whereby the ambient air is entrained from said region through the chamber into the bag.

14. The method in accordance with claim 13 in which said discharge orifices are circular and are equally spaced about a circle and in which said discharging step includes discharging each jet in a conical flow stream from a separate orifice.

15. The method in accordance with claim 13 including discharging said jets from a gas supply pressurized at between 30 and 120 pounds per square inch gauge.

16. The method in accordance with claim 13 in which said step of locating said orifices relative to said chamber includes locating said orifices up to about 1.0 inch outwardly of said exterior opening.

* * * * *